May 29, 1962  F. F. HOLUB ET AL  3,036,992
AMORPHOUS AROMATIC POLYESTER CONTAINING NO
ALIPHATIC CHAIN UNITS
Filed June 1, 1960
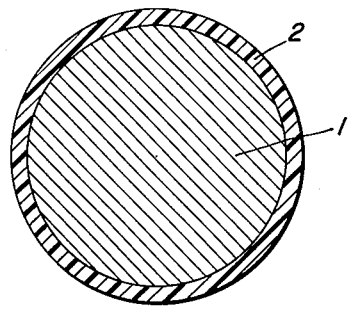
Inventors:
Fred F. Holub;
Simon W. Kantor,
by James H. Underwood
Their Agent.

3,036,992
AMORPHOUS AROMATIC POLYESTER CONTAINING NO ALIPHATIC CHAIN UNITS
Fred F. Holub, Scotia, and Simon W. Kantor, Schenectady, N.Y., assignors to General Electric Company, a corporation of New York
Filed June 1, 1960, Ser. No. 33,128
8 Claims. (Cl. 260—47)

This invention relates to synthetic polymeric compositions, and more particularly, to a superpolyester formed of (1) p-phenylene units, (2) units selected from the group consisting of o-phenylene units, m-phenylene units, and o,o'-biphenylene units, (3) isophthalate units, and (4) terephthalate units, and still more particularly, to such superpolyesters having an intrinsic viscosity of at least 0.5 and wherein the p-phenylene terephthalate is no greater than 70 mole percent of the total ester content of the superpolyester.

Although superpolyesters are well known in the art, superpolyesters have had to have an aliphatic component in the polymer chain in order for them to be obtained with the high molecular weight characteristic of the superpolyesters. The ordinary resinous esters of a dicarboxylic acid and a dihydric alcohol are polymers having many monomeric units in the polymer molecule, but they still have relatively low molecular weights as compared to the superpolyesters. Because of the longer polymer molecule associated with the higher molecular weights, the superpolyesters have many useful properties not possessed by the corresponding resinous esters, for example, the impact, flexible and tensile strength properties, are much greater and furthermore, the films and fibers which can be formed from the superpolyesters can be structurally oriented by cold drawing techniques to produce films and fibers which are much more flexible and of higher strength properties in the direction of orientation than the unoriented products.

It has long been known that aromatic ring compounds are much more stable and have much more desirable high temperature properties than the corresponding aliphatic compounds. Unfortunately, the aromatic compounds usually have correspondingly higher melting points. Therefore, there have been many attempts to prepare polyesters from dihydric phenols and aromatic dicarboxylic acids for use in applications requiring the ability to withstand degradation at elevated temperatures. However, in all attempts the product has been an infusible, insoluble polymer, or a very brittle polymer of no utility, depending on the particular phenol and acid chosen. The closest approach to obtaining a completely aromatic superpolyester has been to react a dihydric phenol with an alkylene oxide to produce a bis(hydroxyalkoxy)aryl compound. For example, in order to make a superpolyester using hydroquinone, the latter is first reacted with, for example, ethylene oxide, to produce 1,4-bis(β-hydroxyethoxy)benzene. These compounds are esterified by reaction with a dibasic acid or a dibasic acid chloride, or by an ester interchange reaction to form its corresponding superpolyester. The alkyl groups in the polymer chain lowered the melting point and increased the solubility sufficiently that either melt or solvent processes could be used for carrying out the reaction. Although such a procedure permitted dihydric phenols and aromatic dicarboxylic acids to be incorporated into superpolyesters, the high temperature stability of the product was sacrificed, due to the introduction of the aliphatic groups into the polymeric chain. Any attempt to react dihydric phenol with a dicarboxylic acid or the ester or acid chloride derivative thereof always resulted in the obtaining of low molecular weight materials which were insoluble and infusible or extremely brittle. The melt process failed because of the fact that even the melting point of the low molecular weight material was so high that thermal decomposition of the polymer always resulted prior to the obtaining of the required high molecular weight material. The ester interchange or the reaction of the acid chloride always failed because of the fact that if carried out in solution the low molecular weight material was precipitated from the solution and was incapable of reacting further to form the high molecular weight material. Attempts to heat the low molecular weight polymer or carry out the reaction without the use of solvents always failed, again because thermal decomposition took precedence over the formation of the high molecular weight polymer.

Our invention may be better understood by reference to the following description, taken in connection with the following drawing, in which:

The sole FIGURE is a cross-sectional view of an insulated electrical conductor within the scope of the present invention.

We have discovered that superpolyesters having the four structural units (1) p-phenylene units, (2) units selected from the group consisting of o-phenylene units, m-phenylene units and o,o'-biphenylene units, (3) isophthalate units and (4) terephthalate units, can be made which have intrinsic viscosities of at least 0.5. Surprisingly, the melting point is, at the most, only slightly higher than the corresponding, lower molecular weight polyesters, but the physical properties are increased tremendously. These superpolyesters can also be described as supercopolyesters in which the structural units are p-phenylene isophthalate units, p-phenylene terephthalate units, and units selected from the group consisting of o-phenylene isophthalate units, o-phenylene terephthalate units, m-phenylene isophthalate units, m-phenylene terephthalate units, o,o'-biphenylene isophthalate units, and o,o'-biphenylene terephthalate units. The repeating structural unit of these superpolyesters containing these structural units in any order of arrangement such as regular, ordered, block, random, etc., may be represented by the formula

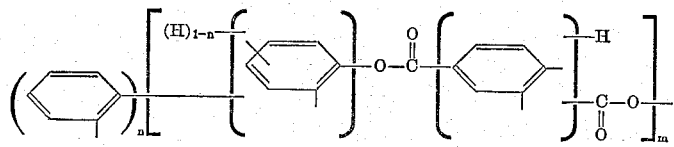

where $n$ is an integer from 0 to 1 with the proviso that when $n$ is 1 the o-phenylene radical is attached to the ortho group of the phenyl radical, and $m$ is an integer representing the number of repeating units in the molecular chain. The total number of such units in our superpolyesters is probably at least 50 or higher. However, intrinsic viscosity is a better means of indicating molecular weight, due to the uncertainty of determining the actual number of units in the molecule, which, at best, is an average value of approximate magnitude.

Intrinsic viscosity is well known in the art and is described in detail in many places in published literature, for example, on page 309 of the book by P. J. Flory, "Principles of Polymer Chemistry," Cornell University Press, Ithaca, New York, 1953. An intrinsic viscosity of at least 0.5, which in the case of our polymers is measured at 75° C. while dissolved in 2,4,6-trichlorophenol, is necessary in order for the polymers to be used for the making of films and fibers having any utility. Polyesters having intrinsic viscosities below this value lack the necessary properties to form useful films and fibers as indicated by their brittleness which increases as the intrinsic viscosity decreases.

The preparation of these superpolyesters is made possible by our discovery that there is a particularly useful group of solvents having the unique property that, although they are not solvents for the polymer at ordinary temperatures, they do become solvents for the completely aromatic polyesters at elevated temperatures, and for the first time permit superpolyesters to be easily prepared from a dihydric phenol and an aromatic dicarboxylic acid when used in the form of the aromatic dicarbonyl halide. Surprisingly enough, not all solvents which are capable of dissolving the resinous polyesters resulting from the reaction are capable of producing the superpolyesters. This unique property appears to be limited to benzophenone, m-terphenyl, chlorinated biphenyls, brominated biphenyls, chlorinated diphenyl oxides, brominated diphenyl oxides, chlorinated naphthalenes and brominated naphthalenes. The reaction of dihydric phenols with aromatic dicarbonyl halides while dissolved in this special class of solvents is more particularly described and claimed in our copending application Serial No. 33,124, filed concurrently herewith and assigned to the same assignee as the present invention.

The above method is particularly applicable for the production of the fusible, thermoplastic, linear superpolyesters having the four structural units (1) p-phenylene units, (2) units selected from the group consisting of o-phenylene units, m-phenylene units, o,o'-biphenylene units, (3) isophthalate units, and (4) terephthalate units. The sum of (1), (2), (3) and (4) equalling 100% of the total units in the polymer molecule, the number of units of (1) being from 25 to 45% of the total, the number of units of (2) being from 5 to 25% of the total, the number of units of (3) being from 20 to 45% of the total, the number of units of (4) being from 5 to 30% of the total, the units of (1) and (2) forming ester groups with the units of (3) and (4), the sum of (1) and (2) being from 1 to 1.02 times the sum of (3) and (4), the sum of (1) and (4) being no greater than 0.7 times the total number of units. This method is ideally suited for preparing such superpolyesters with an intrinsic viscosity of at least 0.5. These superpolyesters are readily prepared by the reaction of hydroquinone and a dihydric phenol selected from the group consisting of catechol, resorcinol, and 2,2'-dihydroxybiphenyl with a mixture of an isophthaloyl halide and a terephthaloyl halide in a 1-step process, or one or more of the acid halides may be reacted with one or more of the dihydric phenols and then the additional reactants added in one or more additional steps, in a multiple-step process; or one of the dihydric phenols may be reacted with one of the acid halides and the other dihydric phenol may be reacted with another acid halide and then the two products condensed. The reaction is carried out while the reactants are dissolved in one of the above-named solvents. Preferably, the isophthaloyl halide and terephthaloyl halide are isophthaloyl chloride and terephthaloyl chloride. The solution is heated to a temperature in the range of 270° C. up to the reflux temperature of the solution until the evolution of the hydrogen halide is at least substantially complete. In the multiple-step process of producing our compositions, the additional reactants may be added after substantially all of the initial reactants have been reacted together and the heating step to evolve the additional hydrogen halide is repeated.

Alternatively, we have found that these superpolyesters may be prepared by another but less suitable method, involving the use of the same specific group of solvents. This method involves the ester interchange reaction between a di-(monobasic acid)ester of the dihydric phenols and the isophthalic acid and terephthalic acid. In this reaction the terephthalic and isophthalic acids and the diesters of a hydroquinone and other dihydric phenols, for example, the diesters, dipropionates, dibenzoates, etc., esters are dissolved in the solvent if the 1-stage process is being used, and heated to a temperature in the range of 240° to 350° C under reflux conditions which allow distillation of the monohydric acid moiety of the dihydric phenols ester, e.g., acetic acid, if it is the acetate ester of the dihydric phenols. This reaction may also be carried out using a multiple-stage process wherein one diester of the dihydric phenol is added first and reacted with one or more of the acids followed by the addition of the second ester and additional acid if desired. Preferably, the isophthalic acid is reacted first and the terephthalic acid is reacted in the second stage, if a 2-stage process is used. In contrast to the 30–120 minutes required for the reaction of the acid halide with the dihydric phenol, the above ester interchange reaction requires an extremely long time, for example, from 6 to 10 hours. Because of the extended reaction time at elevated temperatures, the products contain solvent reaction products, especially if the solvent is halogenated. Furthermore, the ester interchange reaction is incapable of removing all of the monobasic acid ester groups and those still remaining in the polymer reduce the high temperature stability of the polymer. The monobasic acid ester groups which are not removed are also a measure of a lower molecular weight, since they occupy terminal groups which are potential chain propagating sites. The method is, however, capable of producing superpolyesters of this invention having intrinsic viscosities in the range of 0.5 to 0.7. For best products, we prefer to use the reaction of the dihydric phenols with the isophthaloyl chloride and terephthaloyl chloride. Such a reaction is capable of producing transparent, water white, tough, strong products having intrinsic viscosities in the range of 0.5 to 1.5 and above. Either the 1-stage or 2-stage process may be used. However, for those compositions containing the maximum or near maximum amount of hydroquinone and terephthalate groups, e.g., 35 to 45% hydroquinone in conjunction with 25 to 30% terephthaloyl chloride, we prefer to use the 2-stage process in order to minimize the formation of large blocks of p-phenylene terephthalate units within the polymer molecule, since the effect of such large blocks is to increase the melting point considerably and decrease the solubility in comparison to the superpolyester of the same composition without such blocks. In carrying out the 2-stage process, all of the hydroquinone is reacted first with isophthaloyl halide or the terephthaloyl halide is reacted with a dihydric phenol other than hydroquinone, while dissolved in the solvent, at the reaction temperature until at least substantially all of the hydrogen halide is evolved. The remaining ingredients may then be added and the reaction continued to completion, either in a single or in multiple steps. Such a process minimizes the formation of large units of p-phenylene terephthalate units in the polymer molecule. In order to obtain the most stable and highest intrinsic viscosity polymers the dihydric phenol should be used in excess of the acid chloride. The ratio of ingredients charge should take into account process losses. We desire that the final product have a composition in which the molar amount of the dihydric phenol residues represents 1 to 1.02 times the amount of the acid residues. To obtain this we prefer to start with higher amounts, e.g., 1.02 up to 1.05 times as much on a molar basis of dihydric phenols as acid chloride.

Superpolyesters which are related to the superpolyesters of the present invention are disclosed and claimed in our copending applications, filed concurrently herewith and assigned to the same assignee as the present invention.

(1) Linear superpolyesters of p-phenylene isophthalate having an intrinsic viscosity of at least 0.5 wherein the p-phenylene radicals are selected from the group consisting of the p-phenylene, monochloro-p-phenylene and dichloro-p-phenylene radicals, disclosed and claimed in our copending application Serial No. 33,131.

(2) Linear superpolyesters formed of p-phenylene isophthalate units interspersed with p-phenylene terephthalate units, the intrinsic viscosity of the polyester being at least 0.5 and the isophthalate content being at least 60 mole percent of the total isophthalate and terephthalate content of the superpolyester, disclosed and claimed in our copending application Serial No. 33,125.

(3) Linear superpolyesters formed of p-phenylene isophthalate units interspersed with p,p'-biphenyleneisophthalate units, the intrinsic viscosity of the superpolyester being at least 0.5 and the p-phenylene isophthalate units being at least 40 mole percent of the total p-phenylene isophthalate and p,p'-biphenylene isophthalate units in the superpolyester, disclosed and claimed in our copending application Serial No. 33,126.

(4) Chlorine-containing p-phenylene isophthalate, linear superpolyesters having an intrinsic viscosity of at least 0.5 wherein at least 15 mole percent of the isophthalate radicals have from one to two chlorine substituents on the aryl nucleus and the p-phenylene radicals are selected from the group consisting of p-phenylene, monochloro-p-phenylene and dichloro-p-phenylene groups, disclosed and claimed in our copending application Serial No. 33,127.

(5) Linear superpolyesters formed of m-phenylene terephthalate units interspersed with from 0 to 30 mole percent of p-phenylene terephthalate units, based on the total m-phenylene terephthalate and p-phenylene terephthalate units, the intrinsic viscosity of said superpolyester being at least 0.5, disclosed and claimed in our copending application Serial No. 33,130.

The compositions of the present invention differ from the compositions in the copending applications in that they produce for the first time a completely aromatic superpolyester having no aliphatic groups in the molecular chain which can be dissolved readily in a wide variety of solvents in a concentration great enough to allow them to be used for a wide variety of solution coating processes which up to now have been impossible to do with completely aromatic polyesters having an intrinsic viscosity of at least 0.5. The products of the present invention are completely amorphous in nature having little tendency to crystallize, a property which appears to enhance their solubility. This permits a completely aromatic polyester to be solution-coated as a wire enamel on an electrical conductor to produce an electrical insulated conductor having a completely aromatic superpolyester as the insulation. The solutions may also be used to impregnate a wide variety of materials such as paper, cloth, wood, asbestos, glass fibers, either woven or matted, by dip or vacuum impregnation techniques to produce products which can be calendered to produce finished products or stacked and heat and pressure molded to produce useful laminated articles. The solutions may furthermore be used as adhesives to join together a wide variety of materials such as plates of glass, sheets of metal, etc. In this case, it is usually desirable to evaporate the solvent once the article is coated and then to heat and pressure weld the two or more coated objects together. The solutions may also be used to impregnate by dipping or vacuum impregnation techniques an assembled device, such as a transformer, capacitor, motor field coil, motor stator, etc., to coat the various components of the assembled device with a layer of the superpolyester, from which the solvent is evaporated, to leave an insulating coating on the components. The solution may also be passed onto a moving belt of metal from which it is stripped after evaporation of the solvent, to produce a film of the superpolyester as a self-supporting structure. The superpolyester itself in solid form may be molded by extrusion, transfer, or compression molding techniques under heat and pressures, to produce a wide variety of useful molded objects able to withstand relatively high temperatures without decomposition or losing their shape. The resin may also be extruded in the form of films or tubes having a wide variety of uses, such as insulating tapes and sleeves, and insulation or wire, and the like.

In order that those skilled in the art may understand our invention, the following examples are given by way of illustration and not by way of limitation.

EXAMPLE 1

This example illustrates the one-stage process of making a random copolymer of poly-p-phenylene-o,o'-biphenylene isophthalate terephthalate.

A mixture of 7.80 grams of hydroquinone (0.071 mole), 5.60 grams of o,o'-dihydroxybiphenyl (0.030 mole), 10.15 grams of isophthaloyl chloride (0.05 mole), 10.15 grams of terephthaloyl chloride (0.05 mole), and 177.5 grams of redistilled mixed monochlorobiphenyls was stirred and heated under nitrogen. After 4 minutes the reaction mixture was at 160° C. and the HCl evolution had started. At the end of 10 minutes the temperature had reached 280° C. and the HCl evolution had subsided. The reaction mixture was then heated for 40 minutes at a temperature of 275°–281° C. At the end of this time the mixture was quite viscous and upon cooling, the polymer precipitated at about 260° C. The polymer was separated from the reaction mixture and washed 4 times with one-liter portions of acetone, filtered and dried to give 23.2 grams of white poly-p-phenylene-o,o'-biphenylene isophthalate terephthalate. A sample of this polymer melted at 301°–328° C. and had an intrinsic viscosity of 0.79 in 2,4,6-trichlorophenol at 75° C. A one-gram sample of this polymer was pressed between aluminum foil at 415° C. under a pressure of 500 lbs./square inch. The resulting water-quenched film was very tough and flexible but slightly hazy.

In a similar manner, copolymers containing different molar percentages of starting materials were prepared. These copolymers, including their melting points and intrinsic viscosities, are tabulated in Table I. All three polymers were soluble in hot or cold cresol. The first two copolymers in the table were completely soluble in hot or cold N-methyl pyrrolidone while the last copolymer formed a hazy solution in the same solvent. Generally, as the melting point decreases, the solubility increases.

The first copolymer in the table formed tough, clear, flexible films when pressed at 340°–375° C. and 500–2000 lbs./square inch pressure. These films were essentially amorphous and crystallized only with difficulty. The second copolymer contains only 5 mole percent o,o'-biphenylene groups and crystallizes more readily. Completely clear films of this polymer were obtained by pressing the powder at 350°–390° C. and 1000 lbs./square inch pressure, followed by quenching the hot films in water. When these hot films were allowed to cool slowly in air, they crystallized to form a stiff, opaque film.

247°–278° C. A sample of this polymer had an intrinsic viscosity of 0.65 in 2,4,6-trichlorophenol at 75° C. Samples of the powder were pressed at 350° C. and 1000–2000 lbs./square inch pressure to give clear, tough, flexi-

TABLE I
*One-Stage Copolymers Containing 2,2'-Biphenol*

| Composition,[1] molar percent | | | | React. cond. min. at ° C. | Precip. temp., ° C. | Yield, Percent | Melting point, ° C. | Intrinsic viscosity of polymer, $[\eta]$[2] |
|---|---|---|---|---|---|---|---|---|
| H | 2DP | I | T | | | | | |
| 40.6 | 9.9 | 39.7 | 9.9 | 23 at 285–289 | 200 | 79.4 | 292–311 | 0.56 |
| 45.5 | 5.0 | 39.6 | 9.9 | 20 at 280–282 | 230 | 93.6 | 334–351 | 0.72 |
| 35.3 | 15.0 | 24.9 | 24.9 | 40 at 275–281 | 260 | 90.4 | 301–328 | 0.79 |

[1] H=Hydroquinone; 2DP=2,2'-dihydroxybiphenyl; I=Isophthaloyl chloride; T=Terephthaloylchloride.
[2] Measured in 2,4,6-trichlorophenol at 75° C.

EXAMPLE 2

This example illustrates the two-stage method of preparing a copolymer of poly-p-phenylene-o,o'-biphenylene isophthalate terephthalate. The polymers made by this method are lower melting and more soluble than the identical composition made by the one-stage process of Example 1.

A mixture of 6.80 grams (0.062 mole) of hydroquinone, 7.45 grams (0.040 mole) of o,o'-dihydroxybiphenyl, 10.15 grams (0.050 mole) of isophthaloyl chloride and 200.0 grams of redistilled, mixed monochlorobiphenyl was stirred and heated under nitrogen. The reaction started at about 150° C. and was heated for 14 minutes from 29° C. to 284° C. where the solvent was refluxing. The heating was stopped and the reaction mixture was allowed to cool to 245° C. in order to add 10.15 grams (0.050 mole) of terephthaloyl chloride. The heating was resumed to get the mixture refluxing at 285° C. The mixture was maintained under reflux for 23 minutes at 280°–285° C. The resulting viscous solution allowed to cool. The polymer precipitated at 170° C. to give a mushy mixture. When cooled to room temperature the polymer was freed from solvent with acetone, filtered and washed 4 times with one-liter portions of refluxing acetone. The polymer was filtered and dried to give 25.4 grams (95.8% yield) of white poly-p-phenylene-o,o'-biphenylene isophthalate terephthalate, melting at ble films. These films were transparent and amorphous whether the polymer was quenched or slowly air-cooled.

Following the procedure outlined above, a number of 2-stage copolymers containing different molar percentages of starting materials were prepared. These polymers are tabulated in Table II. All the polymers in this table are soluble in hot cresol or N-methyl pyrrolidone. In addition, the last four polymers are soluble in hot or cold sym-tetrachloroethane. Clear, transparent films of these four polymers were obtained by casting the films from 3–5% solutions in sym-tetrachloroethane.

The polymers in Table II were pressed at temperatures of 350°–375° C. and 1000–4000 lbs./square inch pressure to give tough, flexible films. The first polymer in the table contained the smallest percentage of diphenol and had the greatest tendency to crystallize. The last four polymers did not crystallize readily and formed transparent, amorphous films whether the molded polymers were quenched or air-cooled.

The tensile strengths and elongations of the first four polymers in Table II were measured at room temperature, 100° C., 150° C., and 200° C., on molded films of the respective polymers. The data are tabulated in Table III. These films are strong and flexible and remain strong up to 150° C. At higher temperatures, the tensile drops when the polymers contain more than 15 mole percent o,o'-biphenol.

TABLE II
*Two-Stage Copolymers Containing 2,2'-Biphenol*

| Composition,[1] molar percent | | | | React. cond. min. at ° C. | Precip. temp., ° C. | Yield, Percent | Melting point, ° C. | Intrinsic viscosity of polymer, $[\eta]$[2] |
|---|---|---|---|---|---|---|---|---|
| H | 2DP | I | T | | | | | |
| 40.6 | 9.9 | 29.8 | 19.8 | 22 at 280–284 | 205 | 90.6 | 280–311 | 0.83 |
| 35.6 | 14.9 | 24.8 | 24.8 | 17 at 282–285 | 170 | 95.8 | 247–278 | 0.65 |
| 31.2 | 19.8 | 24.8 | 24.8 | 23 at 280–285 | 110 | 95.5 | 232–261 | 0.60 |
| 35.3 | 14.9 | 24.9 | 24.9 | 25 at 282–284 | 170 | 90.5 | 239–302 | 0.79 |
| 35.5 | 15.0 | 44.9 | 5.0 | 20 at 274–276 | 165 | 93.6 | 269–291 | 0.60 |

[1] H=Hydroquinone; 2DP=2,2'-dihydroxybiphenyl; I=Isophthaloyl chloride; T=Terephthaloylchloride.
[2] Measured in 2,4,6-trichlorophenol at 75° C.

TABLE III
*Physical Properties of Polymers in Table II*

| Polymer No. from Table II | Room temp. | | 100° C. | | 150° C. | | 200° C. | |
|---|---|---|---|---|---|---|---|---|
| | Tensile, p.s.i. | Elong., percent | Tensile, p.s.i. | Elong., percent | Tensile, p.s.i. | Elong., percent | Tensile, p.s.i. | Elong., percent |
| 1 | 10,450 | 47 | 6,910 | 62 | 2,380 | 283 | 913 | 390 |
| 2 | 9,540 | 24 | 6,730 | 61 | 1,910 | 124 | 170 | 208 |
| 3 | 9,690 | 34 | 7,830 | 80 | 2,620 | 90 | 35 | 203 |
| 4 | | | | | | | 250 | 530 |

EXAMPLE 3

This example illustrates the one-stage method of making a random copolymer of poly-p-phenylene-m-phenylene isophthalate terephthalate.

A mixture of 8.41 grams (0.0765 mole) of hydroquinone, 2.80 grams (0.0255 mole) of resorcinol, 16.24 grams (0.0800 mole) of isophthaloyl chloride, 4.06 grams (0.0200 mole) of terephthaloyl chloride, and 200 grams of redistilled mixed trichlorobiphenyls were stirred and heated under nitrogen. After 4 minutes a homogeneous yellow solution was obtained and the HCl evolution had started. After 11 minutes the reaction mixture had reached 300° C. and the HCl evolution had slowed down. The reaction mixture was heated for an additional 21 minutes at a temperature of 300°–315° C. to give a viscous, yellow solution of polymer. The mixture was cooled and the polymer precipitated at 190° C. to give a pasty mixture. When cooled to room temperature the isolated polymer was washed three times with one-liter portions of refluxing acetone, filtered and dried to yield 23.8 grams of polymer. A sample of this polymer had an intrinsic viscosity of 0.76 in 2,4,6-trichlorophenol at 75° C. The melting point of this polymer was 303°–332° C. A one-gram sample of polymer was pressed between aluminum foil at a temperature of 355° C. and 1000 lbs./square inch pressure. The resulting quenched film was transparent, flexible and tough.

A number of similar copolymers were prepared by using different mole ratios of the same ingredients, following the directions of Example 3. The properties of these polymers are tabulated in Table IV. Tough, flexible films were prepared from these polymers by pressing the powders at 350°–375° C. and 1000–3000 lbs./square inch pressure. These films were completely amorphous and transparent when quenched from the hot mold. When the films were allowed to cool in air, they were only slightly hazy, flexible and had crystallized to a minor degree. By allowing the hot films to cool very slowly in the molds, they crystallized to a larger extent to produce translucent, flexible, tough films.

The three polymers in Table IV are soluble in hot and cold cresol and N-methyl pyrrolidone. The solubility of the copolymer increased as the resorcinol content increased. Thus, the second copolymer was soluble in sym-tetrachlorcethane while the other two polymers were only partly soluble.

sequently reacted with a mixture of hydroquinone and isophthaloyl chloride.

A mixture of 8.91 grams of resorcinol (0.081 mole), 24.30 grams of terephthaloyl chloride (0.120 mole), and 325 grams of mixed trichlorobiphenyls was placed in a reaction flask which was flushed with dry nitrogen gas. This mixture was stirred while gradually increasing the temperature. After 6 minutes, the temperature was 160° C. and a clear solution was obtained along with evolution of HCl. After 16 minutes, the temperature was 275° C. and the evolution of HCl was subsiding. The mixture was further heated for 6 minutes between 275° and 332° C. and then allowed to cool to 230° C. Then, 13.20 grams of hydroquinone (0.120 mole), and 16.24 grams of isophthaloyl chloride (0.080 mole) was added and the heating was resumed. After 7 minutes of heating, the temperature rose to 320° C. and was maintained at 320°–330° C. for 5 minutes to yield a viscous clear solution. The solution was then allowed to cool whereupon the polymer precipitated as a solid at 200° C. The polymer was washed with three one-liter portions of acetone and then washed with two one-liter portions of boiling acetone, filtered and air dried. There was obtained 41.7 grams (86.8% yield) of a poly-p-phenylene-m-phenylene isophthalate terephthalate. This polymer had a melting point of 315°–332° C. and an intrinsic viscosity of 0.93 in 2,4,6-trichlorophenol at 75° C. A sample was pressed between aluminum foil at 415° C. and 1000 lbs./square inch pressure, followed by cooling in air to give a slightly hazy, tough, flexible film. When quenched to room temperature, the film was amorphous and transparent, exhibiting a tensile strength of 11,600 p.s.i. and an elongation of 34%.

A number of polymers with different mole ratios of starting materials were similarly prepared. Their properties are listed in Table V. These polymers all formed tough, flexible films when molded at 350° to 400° C. and 500–4000 lbs./square inch pressure. The first polymer, containing the most resorcinol did not crystallize and formed amorphous, transparent films whether the hot films were quenched or allowed to cool very slowly in the mold. These films exhibited excellent strength at elevated temperatures as indicated by the following data:

TABLE IV

*One-Stage Polymers Containing Resorcinol*

| Composition,[1] molar percent | | | | React. cond. min. at ° C. | Precip. temp., ° C. | Yield, Percent | Melting point, ° C. | Intrinsic viscosity of polymer, $[\eta]$ [2] |
|---|---|---|---|---|---|---|---|---|
| H | R | I | T | | | | | |
| 37.9 | 12.6 | 39.6 | 9.9 | 21 at 300–315 | 190 | 98.3 | 295–323 | 0.76 |
| 25.2 | 25.2 | 24.8 | 24.8 | 20 at 310–325 | 170 | 95.0 | 229–285 | 0.71 |
| 37.9 | 12.6 | 29.7 | 19.8 | 15 at 310–325 | 220 | 98.3 | 287–319 | 0.75 |

[1] H=Hydroquinone; R=Resorcinol; I=Isophthaloyl chloride; T=Terephthaloyl chloride.
[2] Measured in 2,4,6-trichlorophenol at 75° C.

EXAMPLE 4

This example illustrates the two-stage method of preparing our copolymers of poly-p-phenylene-m-phenylene isophthalate terephthalate. The copolymers may be made by a number of variations which involve combining different ingredients in the first step. The following example describes the method whereby short blocks of poly-m-phenylene terephthalate are first built and sub-

| Temperature, ° C. | Tensile, p.s.i. | Elongation, Percent |
|---|---|---|
| 25 | 9,020 | 11 |
| 100 | 6,300 | 28 |
| 150 | 3,580 | 68 |
| 200 | 735 | 390 |

The polymers in Table V were insoluble in sym-tetrachloroethane in spite of the large percentage of resorcinol in these polymers. However, they were all soluble in cresol or N-methyl pyrrolidone.

mold. A film was prepared by pressing the polymer at 350° C. and 4000 lbs./square inch pressure, followed by quenching. The resulting film was strong and exhibited the following properties, as a function of temperature:

TABLE V

*Two-Stage Copolymers Containing Resorcinol*

| Composition,[1] molar percent | | | | React. cond. min. at ° C. | Precip. temp., ° C. | Yield, Percent | Melting point, ° C. | Intrinsic viscosity of polymer, $[\eta]$ [2] |
|---|---|---|---|---|---|---|---|---|
| H | R | I | T | | | | | |
| 25.3 | 25.3 | 19.8 | 29.6 | 10 at 305-320 | 200 | 93.8 | 320-341 | 0.88 |
| 30.7 | 19.8 | 19.8 | 29.7 | 13 at 282-284[3] | 195 | 74.8 | 302-346 | 1.36 |
| 30.0 | 20.2 | 20.0 | 29.9 | 5 at 315-332 | 200 | 86.8 | 315-332 | 0.93 |

[1] H=Hydroquinone; R=Resorcinol; I=Isophthaloyl chloride; T=Terephthaloyl cholride.
[2] Measured in 2,4,6-trichlorophenol at 75° C.
[3] Prepared in mixed monochlorobiphenyls.

EXAMPLE 5

Other methods of making two-stage copolymers can be used to prepare useful poly-p-phenylene-m-phenylene isophthallate terephthalate copolymers. In the following example, three of the reactants are combined in the first stage and the last reactant is added in the second stage.

A mixture of 5.61 grams of hydroquinone (0.0510 mole), 5.61 grams of resorcinol (0.0510 mole), 8.12 grams of redistilled isophthaloyl chloride (0.040 mole), and 200.0 grams of redistilled mixed trichlorobiphenyls was stirred and heated under nitrogen. The mixture was heated from 30° C. to 320° C. during 8 minutes and refluxed at 320° C. for an additional 2 minutes. The first stage of the reaction was over and the clear solution was allowed to cool to room temperature. Terephthaloyl chloride, 12.18 grams (0.060 mole) was added and the reaction was continued by reheating to 310° C. The second and final stage of polymerization was allowed to proceed for 14 minutes at 310°-320 C. to form a viscous solution. The reaction mixture was allowed to cool whereby the polymer precipitated at 160° C. The polymer was worked up and washed as described in Example 1. There was obtained 23.1 grams (95.4%) of poly-p-phenylene-m-phenylene isophthalate terephthalate, melting at 304°-344° C. A sample of this polymer had an intrinsic viscosity of 0.67 in 2,4,6-trichlorophenol at 75° C. It was soluble in sym-tetrachloroethane, cresol and N-methyl pyrrolidone. Strong, flexible and transparent films were cast from 3-5% solution in sym-tetrachloroethane. Samples of this polymer were pressed into strong films at 310-400° C. and 1000 lbs./square inch pressure. These films were amorphous and transparent whether the hot films were quenched or allowed to cool slowly in the

| Temperature, ° C. | Tensile, p.s.i. | Elongation, percent |
|---|---|---|
| 25 | 8,875 | 15 |
| 100 | 5,640 | 33 |
| 150 | 1,510 | 50 |
| 200 | 71 | 213 |

The low melting m-phenylene isophthalate blocks in this polymer account for the poor strength at 200° C.

Other two-stage copolymers were prepared by reacting the same reactants but in different combinations during the first stage. These polymers are tabulated in Table VI, in which the second column describes the three components which were reacted during the first stage. In these cases, the remaining fourth component was added during the second stage and the polymerization was allowed to proceed under the conditions listed in the third column of the table.

The second polymer in the table was not completely soluble in cresol or N-methyl pyrrolidone due to the

TABLE VI

*Two-Stage Copolymers Containing Resorcinol*

| Composition,[1] mole percent | | | | Stage one reactants | React. cond. min. at ° C. | Precip. Temp.,°C. | Yield, percent | Melting point, ° C. | Intrinsic viscosity of polymer, $[\eta]$ [2] |
|---|---|---|---|---|---|---|---|---|---|
| H | R | I | T | | | | | | |
| 25.2 | 25.2 | 19.8 | 29.7 | HRI | 14 at 310-320 | 160 | 95.4 | 308- 344 | 0.67 |
| 25.2 | 25.2 | 19.8 | 29.7 | HRT | 10 at 310-315 | 190 | 84.8 | 260->500 | 0.67 |
| 40.9 | 9.9 | 41.9 | 7.4 | HIT | 10 at 310 | 235 | 91.0 | 339- 346 | 0.63 |

[1] H=Hydroquinone; R=Resorcinol; I=Isophthaloyl chloride; T=Terephthaloyl chloride.
[2] Measured in 2,4,6-trichlorophenol at 75° C.

presence of p-phenylene terephthalate blocks. Thus, when molded at 350°-415° C. and 2000 lbs./square inch pressure, this polymer formed hazy films which were flexible and tough but crystalline. The last polymer in the table was soluble in hot cresol or hot N-methyl pyrrolidone but not in sym-tetrachloroethane. This polymer was pressed at 350° C. and 2000 lbs./square inch pressure, followed by quenching to give a transparents, flexible film. When the film was cooled slowly, it crystallized and became stiffer and translucent.

EXAMPLE 6

Copolymers containing catechol can be prepared by using the methods of Examples 1–5 and substituting catechol in place of o,o'-dihydroxybiphenyl or resorcinol. A number of catechol-containing copolymers and their properties are listed in Table VII.

The first three copolymers in the table were made by following the method of Example 2 and substituting catechol for the o,o'-biphenol, using the appropriate mole percentages of starting materials. The first two copolymers were more soluble than the third and dissolved in sym-tetrachloroethane, cresol, N-methyl pyrrolidone, and hot dimethylformamide. The third copolymer dissolved only in hot cresol. Strong, transparent, flexible films were obtained from the first two copolymers by casting films from 3–5% solutions in tetrachloroethane. Tough films were also obtained by pressing these polymers at 350°–400° C. and 1000–2000 lbs./square inch pressure.

The last two polymers in Table VII were prepared by following the method of Example 4. The appropriate short blocks of p-phenylene isophthalate or o-phenylene terephthalate were made and the other two remaining ingredients were added and polymerized in a second stage. These two polymers were soluble in hot cresol and were molded into tough films at 375°–415° C. and 2000 lbs./square inch pressure.

A solution was prepared from 5 parts of polymer and 95 parts of sym-tetrachloroethane. In this example the specific polymer which was used was the second copolymer in Table VII. The resulting solution was poured on glass plates and the solvent was evaporated at 80° C. to leave a 1 mil coat. The resulting glass plate was baked at 200° C. for 1 to 2 hours to give a protective coat which was tenaciously adherent to glass and protected the glass from shock, scratches, etc. It was impossible to separate the film from the glass as a coherent film by use of a razor blade.

EXAMPLE 9

This example illustrates that our copolymers can be prepared by an ester exchange reaction, provided that our solvents are used. This process is not as desirable since it is more time-consuming and produces colored products which are in the lowest intrinsic viscosity range required to have the desirable characteristics of our polymers.

A mixture of 15.88 grams of p-phenylene diacetate (0.082 mole), 5.41 grams of 2,2'-diacetoxybiphenyl, 14.12 grams of isophthalic acid (0.085 mole), 2.49 grams of terephthalic acid (0.015 mole), and 220 grams of mixed trichlorobiphenyl is stirred and heated. At 250° C., the acetic acid begins to form and is distilled out of the reaction mixture. The reaction is carried out for 6–

TABLE VII

*Two-Stage Copolymers Containing Catechol*

| Composition,[1] mole percent | | | | Stage one reactants | React. cond. min. at ° C. | Precip. Temp., °C | Yield, percent | Melting point, ° C. | Intrinsic viscosity of polymer, [η][2] |
| --- | --- | --- | --- | --- | --- | --- | --- | --- | --- |
| H | C | I | T | | | | | | |
| 34.5 | 16.3 | 34.5 | 14.8 | HCI | 120 at 300–305 | 169 | 88.7 | 266– 297 | 0.57 |
| 35.3 | 14.4 | 29.9 | 19.9 | HCI | 23 at 280–283 | [3]170 | 88.0 | 307– 328 | 0.92 |
| 40.5 | 9.9 | 24.8 | 24.8 | HCI | 24 at 284 | [3]240 | 91.0 | 318–>500 | 0.91 |
| 36.0 | 14.8 | 29.5 | 19.7 | HI | 16 at 313–325 | 234 | 89.2 | 351– 358 | 0.72 |
| 34.7 | 15.8 | 19.8 | 29.7 | CT | 19 at 328–329 | 225 | 93.4 | 326–>500 | 0.56 |

[1] H=Hydroquinone; C=Catechol; I=Isophthaloyl chloride; T=Terephthaloyl chloride.
[2] Measured in 2,4,6-trichlorophenol at 75° C.
[3] Prepared in mixed monochlorobiphenyls.

EXAMPLE 7

This example illustrates the preparation of insulated conductors using the polymers of this application for the insulation. The specific example is given using the fourth polymer in Table II, poly-p-phenylene-o,o'-biphenylene isophthalate terephthalate. Any other polymers of our invention may be substituted in its place. Several alternative ways can be used to insulate the conductor. For example, an insulated conductor can be prepared by direct extrusion of the polymer on a nickel-coated copper wire to give a flexible, tough, insulated wire. Alternatively, a preformed tape of the polymer, prepared by extrusion or casting, can be wrapped around the conductor. The resulting wrapped wire can be heated to the softening point of the polymer to heat seal the insulation and form a compact system.

A third method of forming an insulated conductor is to apply the polymer on wire from solution. A solution was prepared from 8 parts of polymer and 92 parts of hot cresol. The resulting solution was applied to lengths of copper wire by dipping the wires into the solution at 50° C. In this manner, 4 coats of polymer were applied using a 3-minute bake at 300° C. for each coat. The resulting insulated wire had a 2.0 mil build of polymer which was flexible and could be wound around its own diameter without crazing or cracking. The polymer on wire did not heat shock at 200° C. or 250° C.

EXAMPLE 8

This example illustrates that our polymers may be applied to a number of substrates form solution to form tough, adherent coatings.

8 hours at 310°–320° C. to yield a light brown viscous solution. The reaction is stopped and the polymer is isolated as described in Example 1. The yield of acetic acid is 98–99% and the yield of polymer is 95–98%, isolated as a light tan powder. The intrinsic viscosity of this polymer is 0.5 to 0.6 measured in 2,4,6-trichlorophenol at 75° C. This polymer forms tough, flexible films either by pressing at 350° C. or by casting from solution.

If it is desired to modify the molecular weight of our linear polyesters, chain stopping agents such as one or more monohydric phenols or one or more monobasic acid chloride may be added in minor amounts, e.g., 0.1 to 1% of the corresponding difunctional compound may be added along with the other ingredients, during the condensation reaction, or after the main condensation reaction is completed. Examples of monohydric phenols which may be added are phenol itself, the cresols, e.g., ortho-, meta- and para-cresol, the xylenols, e.g., 2,3-xylenol, 2,4-xylenol, 2,5-xylenol, 2,6-xylenol, 3,5-xylenol, etc., the hydrocarbons and hydrocarbonoxy-substituted phenols, e.g., ethylphenol, propylphenol, isopropylphenol, butylphenol, tertiary butylphenol, amylphenol, the phenylphenols, naphthylphenols, the phenoxyphenols, the methoxyphenols, ethoxyphenols, phenoxyphenols, etc., including all of those phenols in which one or more of the hydrogen atoms attached to the aryl nucleus are replaced by a halogen atom such as fluorine, chlorine, bromine, or iodine, e.g., the mono-, di-, tri-, tetra- and penta-chlorophenols, the mono-, di-, tri-, tetra- and penta-bromophenols, the mono-, di- tri,- tetra-, and penta-iodophenols, the mono-, di-, tri-, tetra- and penta-fluorophenols, the mono-, di-, tri-, tetra-chlorocresols, and the mono-, di-, tri-, chloroxylenols, etc. The monohydric phenol may also be a di- or tri-hydric phenol in which all but one hydroxyl group has been esterified with an acid, e.g., p-hydroxyphenylbenzoate, p-hydroxyphenyltoluate, m-hydroxyphenylbenzoate, o-hydoxyphenylbenzoate, 5-hydroxyphenylene-1,3 dibenzoate, etc.

In those cases where free hydroxyl groups are desired in the polymer chain, a dihydric phenol, e.g., hydroquinone, resorcinol, etc., may be used as the chain stopping agent.

Monobasic acid halides which may be used are the acid halides of the aromatic series such as benzoyl chloride, benzoyl bromide, benzoyl iodide, toluoyl chloride, naphthoyl chloride, biphenylcarbonyl chloride, etc., including halogenated derivatives thereof. Although monobasic acid halides of the aliphatic series may be used, we prefer not to use them since they destroy the high temperature stability of the polymers. For the same reason, we prefer that the esters of the di- and tri-hydric phenols be aromatic monocarboxylic acid esters and that, if substituted, the substituent grouping be chlorine.

The superpolyesters of this invention are suitable for a wide variety of uses; as coating compositions they may be coated onto metallic or non-metallic substrates, by flame spraying, melt casting, or by casting while dissolved in one of the solvents in which it is made, or other solvent in which it is soluble, and thereafter evaporating the solvent at an elevated temperature and, if desired, at reduced pressure. The hot solution of the solvent may be forced through a spinneret into a heated drying tower, preferably maintained at reduced pressure, to form filaments or fibers, or the molten polymer may be forced through spinnerets by well known techniques to form filaments and fibers. The fibers so formed may be formed into yarns or used to form fiber matting. Alternatively, the superpolyesters may be cast from solution or from the melt of the polymer, extruded through a die, or otherwise sheeted to form a continuous film of the superpolyester. Referring to the drawing the compositions may also be extruded or applied from solution onto electrical conductor 1, such as a wire, to form an insulated electrical conductor having our compositions as insulating layer 2. The compositions may also be injection, transfer, or compression molded under heat and pressure to form intricately shaped objects of wide utility, dependent on the particular object molded. Other uses for our films and the fabrics or mats made from the fibers include a wide variety of electrical applications, that is, as a dielectric, for example, as a dielectric in capacitors, as slot insulation for motors, primary insulation for heat-resistant wire, pressure-sensitive electrical tape, split mica insulating tape, i.e., mica sheet laminated between film, small condensers, metal foil laminated to film or film having an adherent metal coating, weather resistant electrical wire, i.e., a conductor wrapped with film coated with asphalt, as a wrapping for submerged pipe to insulate against ground currents, as primary and secondary insulation in transformer construction, as a dielectric in electroluminescent structures, etc. Our compositions may also be used to laminate or adhere glass and metal surfaces to themselves or to each other, or to other similar surfaces; for example, two glass surfaces may be laminated together by inserting an interlayer of the superpolyester either as a powder, as a film, or as a surface coating between two glass surfaces to be joined. Pressure or vacuum is applied to the assembly after it is heated to the softening point of the superolyester to firmly adhere the two glass surfaces together. This process may be used for forming a vacuum-tight seal between two mating glass objects such as for making a cathode ray tube or other device as disclosed and claimed in the application Serial No. 33,129 of Day et al., filed concurrently herewith and assigned to the same assignee as the present invention.

Other valuable uses for the superpolyesters of this invention will be readily apparent to those skilled in the art. Also, many apparently widely different embodiments such as the adding of pigments, fillers, stabilizers, plasticizers, etc., may be made to modify the properties of the superpolyesters without departing from the spirit and scope of our invention. It is therefore to be understood that changes may be made in the particular embodiments of the invention described which are within the full intended scope of the invention as defined by the appended claims.

What we claim as new and desire to secure by Letters Patent of the United States is:

1. A soluble, fusible, linear superpolyester having an intrinsic viscosity of at least 0.5 formed of the four structural units (1) p-phenylene units, (2) units selected from the group consisting of o-phenylene units, m-phenylene units and o,o'-biphenylene units, (3) isophthalate units, and (4) terephthalate units, the sum of (1), (2), (3) and (4) equalling 100 percent of the total units in the polymer molecule, the number of units of (1) being from 25 to 45 percent of the total, the number of units of (2) being from 5 to 25 percent of the total, the number of units of (3) being from 20 to 45 percent of the total, the number of units of (4) being from 5 to 30 percent of the total, the units of (1) and (2) forming ester groups with the units of (3) and (4), the sum of (1) and (2) being from 1 to 1.05 times the sum of (3) and (4), the sum of (1) and (4) being no greater than 0.7 times the total number of units.

2. A soluble, fusible, linear superpolyester having an intrinsic viscosity of at least 0.5 formed of the four structural units (1) p-phenylene units, (2) o-phenylene units, (3) isophthalate units, and (4) terephthalate units, the sum of (1), (2), (3) and (4) equalling 100 percent of the total units in the polymer melocule, the number of units of (1) being from 25 to 45 percent of the total, the number of units of (2) being from 5 to 25 percent of the total, the number of units of (3) being from 20 to 45 percent of the total, the number of units of (4) being from 5 to 30 percent of the total, the units of (1) and (2) forming ester groups with the units of (3) and (4), the sum of (1) and (2) being from 1 to 1.05 times the sum of (3) and (4), the sum of (1) and (4) being no greater than 0.7 times the total number of units.

3. A soluble, fusible, linear superpolyester having an intrinsic viscosity of at least 0.5 formed of the four structural units (1) p-phenylene units, (2) m-phenylene units, (3) isophthalate units, and (4) terephthalate units, the sum of (1), (2), (3) and (4) equalling 100 percent of the total units in the polymer molecule, the number of units of (1) being from 25 to 45 percent of the total, the number of units of (2) being from 5 to 25 percent of the total, the number of units of (3) being from 20 to 45 percent of the total, the number of units of (4) being from 5 to 30 percent of the total, the units of (1) and (2) forming ester groups with the units of (3) and (4), the sum of (1) and (2) being from 1 to 1.05 times the sum of (3) and (4), the sum of (1) and (4) being no greater than 0.7 times the total number of units.

4. A soluble, fusible, linear superpolyester having an intrinsic viscosity of at least 0.5 formed of the four structural units (1) p-phenylene units, (2) o,o'-biphenylene units, (3) isophthalate units, and (4) terephthalate units, the sum of (1), (2), (3) and (4) equalling 100 percent of the total units in the polymer molecule, the number of units of (1) being from 25 to 45 percent of the total, the number of units of (2) being from 5 to 25 percent of the total, the number of units of (3) being from 20 to 45 percent of the total, the number of units of (4) being from 5 to 30 percent of the total, the units of (1) and (2) forming ester groups with the units of (3) and (4), the sum of (1) and (2) being from 1 to 1.05 times the sum of (3) and (4), the sum of (1) and (4) being no greater than 0.7 times the total number of units.

5. A liquid, organic coating composition comprising a solvent containing dissolved therein a linear superpolyester having an intrinsic viscosity of at least 0.5 formed of the four structural units (1) p-phenylene units, (2) units selected from the group consisting of o-phenylene units, m-phenylene units and o,o'-biphenylene units, (3) isophthalate untis, and (4) terephthalate units, the sum of (1), (2), (3) and (4) equalling 100 percent of the total units in the polymer molecule, the number of units of (1) being from 25 to 45 percent of the total, the number of units of (2) being from 5 to 25 percent of the total, the number of units of (3) being from 20 to 45 percent of the total, the number of units of (4) being from 5 to 30 percent of the total, the units of (1) and (2) forming ester groups with the units of (3) and (4), the sum of (1) and (2) being from 1 to 1.05 times the sum of (3) and (4), the sum of (1) and (4) being no greater than 0.7 times the total number of units.

6. A heat and pressure shaped article comprising a linear superpolyester having an intrinsic viscosity of at least 0.5 formed of the four structural units (1) p-phenylene units, (2) units selected from the group consisting of o-phenylene units, m-phenylene units and o,o'-biphenylene units, (3) isophthalate units, and (4) terephthalate units, the sum of (1), (2), (3) and (4) equalling 100 percent of the total units in the polymer molecule, the number of units of (1) being from 25 to 45 percent of the total, the number of units of (2) being from 5 to 25 percent of the total, the number of units of (3) being from 20 to 45 percent of the total, the number of units of (4) being from 5 to 30 percent of the total, the units of (1) and (2) forming ester groups with the units of (3) and (4), the sum of (1) and (2) being from 1 to 1.05 times the sum of (3) and (4), the sum of (1) and (4) being no greater than 0.7 times the total number of units.

7. An insulated electrical conductor comprising an electrical conductor having on its surface a linear superpolyester having an intrinsic viscosity of at least 0.5 formed of the four structural units (1) p-phenylene units, (2) units selected from the group consisting of o-phenylene units, m-phenylene units and o,o'-biphenylene units, (3) isophthalate units, and (4) terephthalate units, the sum of (1), (2), (3) and (4) equalling 100 percent of the total units in the polymer molecule, the number of units of (1) being from 25 to 45 percent of the total, the number of units of (2) being from 5 to 25 percent of the total, the number of units of (3) being from 20 to 45 percent of the total, the number of units of (4) being from 5 to 30 percent of the total, the units of (1) and (2) forming ester groups with the units of (3) and (4), the sum of (1) and (2) being from 1 to 1.05 times the sum of (3) and (4), the sum of (1) and (4) being no greater than 0.7 times the total number of units.

8. A film comprising a linear superpolyester having an intrinsic viscosity of at least 0.5 formed of the four structural units (1) p-phenylene units, (2) units selected from the group consisting of o-phenylene units, m-phenylene units and o,o'-biphenylene units, (3) isophthalate units and (4) terephthalate units, the sum of (1), (2), (3) and (4) equalling 100 percent of the total units in the polymer molecule, the number of units of (1) being from 25 to 45 percent of the total, the number of units of (2) being from 5 to 25 percent of the total, the number of units of (3) being from 20 to 45 percent of the total, the number of units of (4) being from 5 to 30 percent of the total, the units of (1) and (2) forming ester groups with the units of (3) and (4), the sum of (1) and (2) being from 1 to 1.05 times the sum of (3) and (4), the sum of (1) and (4) being no greater than 0.7 times the total number of units.

References Cited in the file of this patent

UNITED STATES PATENTS

| | | |
|---|---|---|
| 2,595,343 | Drewitt et al. | May 6, 1952 |
| 2,954,355 | Young et al. | Sept. 27, 1960 |